US012212558B2

(12) United States Patent
Bonnell-Kangas et al.

(10) Patent No.: US 12,212,558 B2
(45) Date of Patent: Jan. 28, 2025

(54) SECURE SERVICE OPERATION AUTHORIZATION

(71) Applicant: Ford Global Technologies, LLC, Dearborn, MI (US)

(72) Inventors: Aaron Bonnell-Kangas, Detroit, MI (US); Farhan Ehsan, Lasalle (CA); Eugene Karpinsky, Farmington Hills, MI (US); Margherita Trupiano, Northville Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 18/055,887

(22) Filed: Nov. 16, 2022

(65) Prior Publication Data
US 2024/0163277 A1    May 16, 2024

(51) Int. Cl.
    *H04L 9/40*    (2022.01)
(52) U.S. Cl.
    CPC .................. *H04L 63/083* (2013.01)
(58) Field of Classification Search
    CPC .............. H04L 63/083; H04L 63/0853
    See application file for complete search history.

(56) References Cited

U.S. PATENT DOCUMENTS

| | | | |
|---|---|---|---|
| 10,491,392 B2 | 11/2019 | Bardeiski et al. | |
| 2006/0130033 A1* | 6/2006 | Stoffels | G06F 8/61 |
| | | | 717/166 |
| 2013/0111582 A1* | 5/2013 | Forest | G06F 21/44 |
| | | | 726/19 |
| 2015/0024688 A1 | 1/2015 | Hrabak et al. | |
| 2017/0093866 A1* | 3/2017 | Ben-Noon | H04W 12/068 |

FOREIGN PATENT DOCUMENTS

| | | |
|---|---|---|
| CN | 105208070 A | 12/2015 |
| EP | 3726454 A1 | 10/2020 |

* cited by examiner

*Primary Examiner* — Shirley X Zhang
(74) *Attorney, Agent, or Firm* — Christopher Storms; Brooks Kushman P.C.

(57) ABSTRACT

A system and method for performing a secure operation on a vehicle, such as to re-key a vehicle, include transmitting, from a computing device such as a service tool, a service tool request to an access management server over a wide area network, receiving over the wide area network, at the service tool, a secure service response from the access management server upon a verification of the service tool request, the secure service response containing a secure payload, and transmitting the secure payload to secure controller of a specific vehicle being serviced over a vehicle communication interface regardless of whether the service tool is connected to the wide area network.

18 Claims, 2 Drawing Sheets

SECURE SERVICE OPERATION AUTHORIZATION

BACKGROUND

In recent years, automakers have moved away from the use of physical vehicle keys (e.g., metal keys cut to fit lock tumblers) to use vehicle key solutions that rely upon wireless communications, such as facilitated by Near Field Communication (NFC) cards. These solutions may depend on connectivity between a vehicle, a virtual key or key fob, and a cloud computer for some operations, but may also operate in unconnected or unreliably connected environments, including secure vehicle service operations like adding or removing keys to a vehicle.

DETAILED DESCRIPTION

Figure 1:
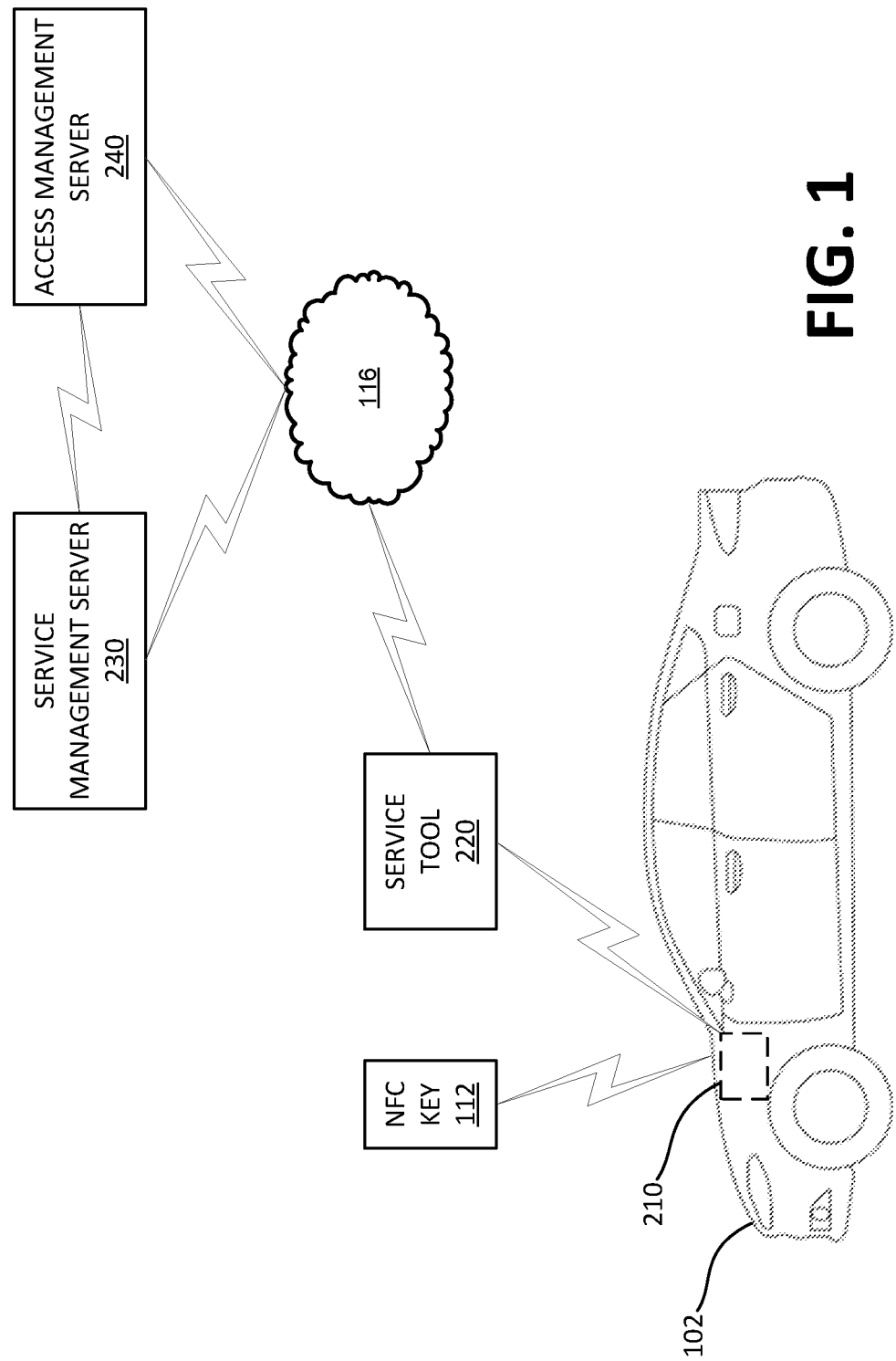
FIG. 1 is a block diagram of an example system for performing a secure service operation.

The present disclosure includes systems in which a user, such as a vehicle service technician, uses a portable computing device, e.g., a dedicated service tool, to perform a secure service operation, such as to add or change a new wireless or virtual key for access to a vehicle. Adding or changing the key may involve allowing access to a computing device such as an electronic control module to permit the user to perform authorized operations on the vehicle. However, monitoring and logging of user access (i.e., allowing recording of which user has accessed which module) may not include monitoring and logging what the user did after they accessed the module. For example, if a user accesses a module to add a key, but then secretly adds a second key, there may be no way for this to be detected.

In accordance with the present disclosure, secure service operations via a secure vehicle module are authorized and logged individually. Such secure vehicle operations may include: adding, deleting, or changing a vehicle key (e.g., an NFC key card); updating, clearing, or modifying an encryption key for message authentication on vehicle networks (e.g., a CAN message authentication (CMA) key); modifying settings with restricted access (e.g., emission controls); and updating or revoking certificates stored in a module to authenticate communications with a manufacturer. Thus, in the cases of adding a vehicle key, a user who requests a single key add operation will not be able to add a second key, nor will they be able to add a key other that the one they originally requested. The user's identity, the specific vehicle, and the specific secure operation of the key being added are all stored, further enhancing security. Thus, in the case of adding a vehicle key, security in the vehicle is enhanced by avoiding the need to create a "master key," in addition to ensuring that secure operations like vehicle re-keying are traceable.

In one or more implementations of the present disclosure, a system includes a computing device having a processor and a memory, wherein the memory stores instructions executable by the processor such that the computing device is programmed to: transmit a service tool request for a secure service operation on a specific vehicle being serviced to a remote server over a wide area network; receive a secure service response over the wide area network from the remote server upon a verification of the service tool request, the secure service response containing a secure payload; and transmit the secure payload to a secure controller of the specific vehicle over a vehicle communication interface regardless of whether the computing device is connected to the wide area network.

In an implementation, the service tool request may include the secure service operation, credentials of a service user, and credentials of the computing device.

In another implementation, the secure service operation may include an identification of the specific vehicle and a specific vehicle key to be added, deleted, or restored to the specific vehicle.

In an implementation, the specific vehicle key may be selected from a retail user key, a factory key, and a fleet key.

In another implementation, the system may include a service management server connected to the wide area network, wherein the remote server may be an access management server, the instructions programmed to transmit the service tool request to the access management server may transmit the service tool request to the service management server, the instructions programmed to receive the secure service response from the access management server may receive the secure service response from the service management server, and the service management server may include a server processor and a server memory, wherein the server memory stores instructions executable by the server processor such that the service management server is programmed to: confirm that the secure service operation is valid and that the service user and computing device are authorized based upon their respective credentials; create a secure service request based upon the service tool request; transmit the secure service request to the access management server; receive the secure service response from the access management server; and forward the secure service response to the computing device.

In an implementation, the instructions executable by the processor may further include instructions such that the computing device is programmed to: receive an access event message from the secure controller indicating the secure payload is received; and relay the access event message to the service management server, wherein the instructions executable by the server processor may further include instructions such that the server computing device is programmed to: receive an access event message from the computing device indicating the secure payload is received; and relay the access event message to the access management server.

In an implementation, the instructions executable by the processor may further include instructions to perform a pre-check prior to transmitting the service tool request such that the computing device is programmed to: receive input of the secure service operation; transmit a precondition check for the secure service operation to the secure controller of the specific vehicle over the vehicle communication interface; and receive an authorization from the secure controller.

In an implementation, the secure service operation may include an identification of the specific vehicle and a specific vehicle key to be added, deleted, or restored to the specific vehicle.

In another implementation, the specific key may be selected from a retail user key, a factory key, and a fleet key.

In an implementation, the instructions executable by the processor may further include instructions such that the computing device is programmed to: receive an access event message from the secure controller indicating the secure payload is received; and relay the access event message to the remote server.

One or more implementations of the present disclosure may be to a method including: transmitting, from a computing device, a service tool request for a secure service operation on a specific vehicle being serviced to a remote server over a wide area network; receiving, at the computing device, a secure service response over the wide area network from the remote server upon a verification of the service tool request, the secure service response containing a secure payload; and transmitting the secure payload to a secure controller of the specific vehicle over a vehicle communication interface regardless of whether the computing device is connected to the wide area network.

In an implementation of the method, the service tool request may include the secure service operation, credentials of a service user, and credentials of the computing device.

In another implementation of the method, the secure service operation may include an identification of the specific vehicle and a specific vehicle key to be added, deleted, or restored to the specific vehicle.

In an implementation of the method, the specific vehicle key may be selected from a retail user key, a factory key, and a fleet key.

In an implementation of the method, the remote server may be an access management server, wherein transmitting of the service tool request to the access management server includes transmitting the service tool request to a service management server, wherein receiving of the secure service response from the access management server includes receiving the secure service response from the service management server, and the method may further include: confirming, at the service management server, that the secure service operation is valid and that the service user and computing device are authorized based upon their respective credentials; creating, at the service management server, a secure service request based upon the service tool request; transmitting, from the service management server, the secure service request to the access management server; receiving, at the service management server, the secure service response from the access management server; and forwarding, by the service management server, the secure service response to the computing device.

In an implementation, the method may further include: receiving, at the computing device, an access event message from the secure controller indicating the secure payload is received; and relaying, from the computing device, the access event message to the service management server, receiving, at the service management server, the access event message from the computing device indicating the secure payload is received; and relaying, from the service management server, the access event message to the access management server.

In an implementation, the method may further include performing a pre-check prior to transmitting the service tool request by: receiving, at the computing device, input of the secure service operation; transmitting, from the computing device, a precondition check for the secure service operation to the secure controller of the specific vehicle over the vehicle communication interface; and receiving, at the computing device, an authorization from the secure controller.

In an implementation of the method, the secure service operation may include an identification of the specific vehicle and a specific vehicle key to be added, deleted, or restored to the specific vehicle.

In another implementation of the method, the specific key may be selected from a retail user key, a factory key, and a fleet key.

In an implementation, the method may further include: receiving, at the computing device, an access event message from the secure controller indicating the secure payload is received; and relaying, from the computing device, the access event message to the remote server.

With reference to FIG. 1, a connected system 100 for secure service operations can provide digital data communications between a secure controller 210 of a vehicle 102, a portable device such as a service tool 220, a service management server 230, and an access management server 240. While the secure controller 210 in the vehicle 102 may or may not be connected to a wide area network 116 such as the Internet, the service management server 230 and access management server 240 may be directly or indirectly connected to the wide area network 116, and the service tool 220 may be directly or indirectly connected to the wide area network 116 during at least a portion of time in which it communicates with the service management server 230.

Vehicle 102 is a set of components or parts, including hardware components and typically also software and/or programming, to perform a function or set of operations in the vehicle 102. Vehicle subsystems typically include a braking system, a propulsion system, and a steering system as well as other subsystems including but not limited to a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

An implementation of the connected system 100 will be described with respect to a secure operation involving adding a wireless key 112, but is not limited thereto, and may be used for other secure service operations in accordance with the present disclosure.

The secure controller 210 is a computing device, typically a secured/protected module installed in the vehicle 102, e.g., an electronic control module (ECM) or the like. In an implementation for adding, deleting, or changing a vehicle key in the form of a wireless key 112 using NFC, the secure controller 210 could take the form of an NFC controller. The secure controller 210 includes a processor, a memory storing executable instructions, a vehicle communication interface for connecting to the service tool 220, and an NFC interface for communicating with a wireless key 112. Thus, the secure controller 210 can communicate with the wireless key 112 to permit user operation of the vehicle 102 and can communicate with a service tool 220 to permit secure service operations on the vehicle. In some examples, the wireless key 112 is an NFC key, i.e., includes a chip or chipset to enable near field communications (NFC). In other examples, the wireless key 112 could operate according to other protocols, e.g., Bluetooth low energy (BLE), Wi-Fi, etc.

A user device such as the service tool 220 includes a processor, a memory storing executable instructions, a vehicle communication interface for connecting to the secure controller, and a network communication interface for communication over the wide area network 116. Thus, the service tool 220 may connect for communication with secure controller 210 of vehicle 102 using a wired connection, such as via an on-board diagnostic port (e.g., OBD-II port), or via a wireless connection. During connection with the secure controller 210, the service tool 220 may not be connected to the wide area network 116, thus permitting offline secure operations, such as performing a vehicle key change operation at a remote location without network access.

Figure 2:
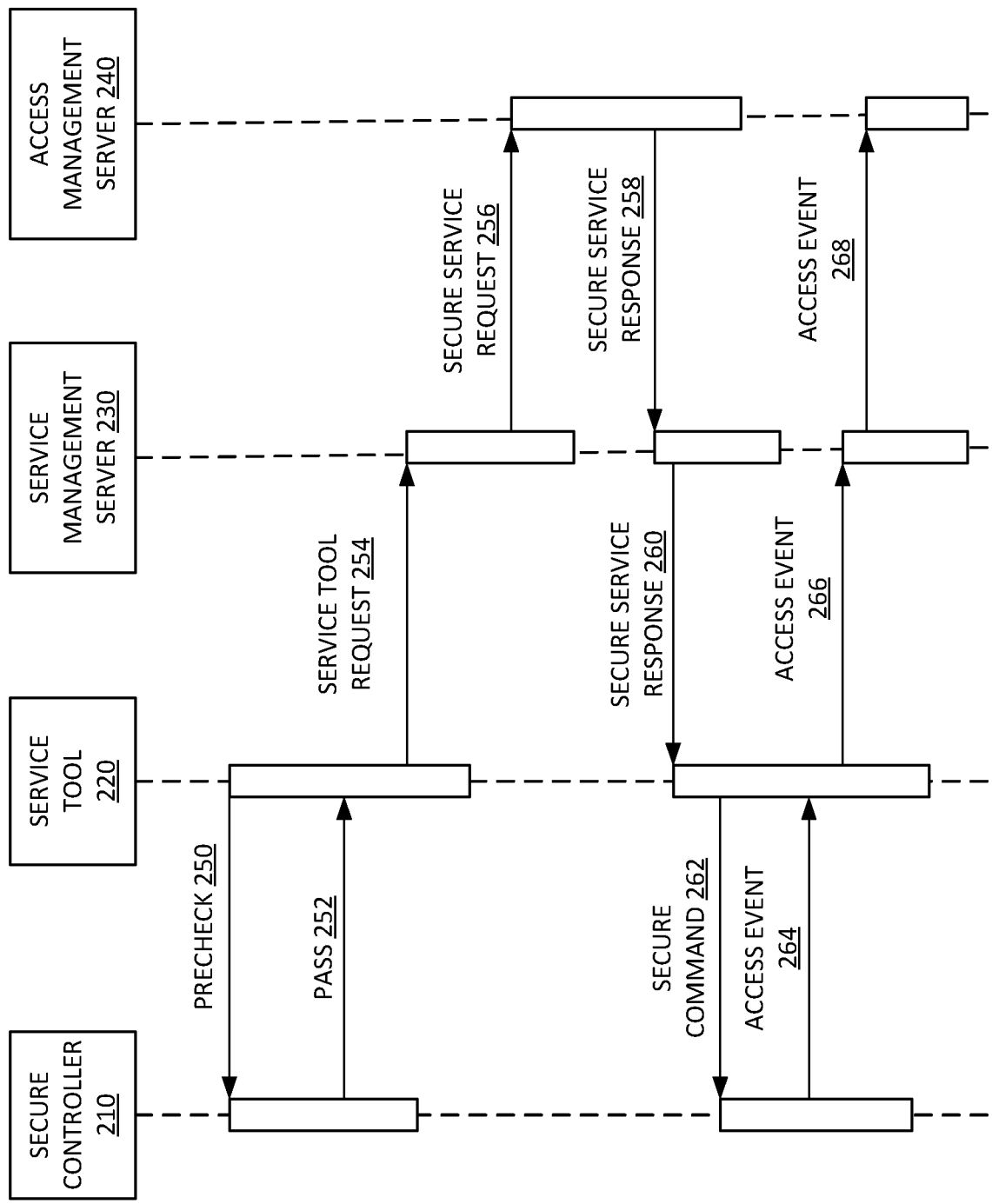
FIG. 2 is a data flow diagram of an example process for performing a secure service operation.

With reference to FIGS. 1 and 2, for a secure operation vehicle key change, the service tool 220 is programmed to transmit key add request to access management server 240 in a message via the network 116 to the service management server 230, such as service tool request message 254 that includes a request for a vehicle key change operation, i.e., to add, delete, or restore a wireless key 112 (i.e., a virtual or electronic vehicle key) for a specific vehicle 102.

The service tool 220 is also programmed to receive a secure service response message 260 from the access management server 240 via the service management server 230, extract a secure command message 262 from the secure service response message 260, transmit the secure command message 262 to the secure controller 210, receive an access event message 264 response from the secure controller 210, and relay the access event message 266 to the access management server 240 via the service management server 230.

The service management server 230 includes a processor, memory storing executable instructions, and a network interface for communication over the wide area network 116. Optionally, the service management server 230 may include an interface for direct connection with the access management server 240. The service management server 230 is programmed to receive requests for secure operations such as key change requests from a service tool 220, such as service tool request message 254 associated with the secure operation to add, delete, or restore a wireless key 112 (i.e., vehicle key, which may be a retail user key, a factory key, or a fleet key) for a specific vehicle such as vehicle 102. The service management server 230 may also be programmed to authenticate a service tool request message 254, for example, by authenticating a user, a specific vehicle, and/or a secure operation that is included in the service tool request message 254. The service management server 230 may also be programmed to forward an authenticated service tool request message 254 as a secure service request message 256 to the access management server 240 and forward secure service response 258 from the access management server 240 as secure service response message 260 to the service tool 220. The service management server 230 may also be programmed to receive an access event message 266 from the service tool 220 and relay the access event message 268 to the access management server 240. The various requests, responses, and events can be saved by the service management server 230 for audit purposes.

The access management server 240 includes a processor, memory storing executable instructions, and a network interface for communication over the wide area network 116. Optionally, the access management server 240 may include an interface for direct connection with the service management server 230. The access management server 240 is programmed to receive secure operation requests such as key change requests from a service tool 220, such as a secure service request message 256 associated with a secure service operation to add, delete, or restore a wireless key 112 (i.e., vehicle key, which may be a retail user key, a factory key, or a fleet key) for a specific vehicle such as vehicle 102. The access management server 240 is responsible for generating and managing secure keys, certificates, etc., such as the digital key data required to activate or deactivate a specific digital key on each specific vehicle 102. The access management server 240 may also be programmed to receive authenticated secure service request messages 256, e.g., requesting a key change, from the service management server 230 and transmit a secure service response 258 with digital key data in a secure payload to the service management server 230 to the service tool 220. The service management server 230 may also be programmed to receive an access event message 266 from the service tool 220 and relay the access event message 268 to the access management server 240. The various requests, responses, and events can be saved by the access management server 240 for audit purposes.

With reference to FIG. 2, a data flow is illustrated of an example process for performing a secure service operation for a key change (e.g., adding, deleting, or restoring a specific vehicle key) for a vehicle 102. A key change is merely one implementation of a secure service operation within the present disclosure. Other secure service operations on a secure controller of vehicles include, but are not limited to, updating, clearing, or modifying encryption keys for message authentication on vehicle networks (e.g., a CMA key), modifying settings with restricted access (e.g., emission controls), and updating or revoking certificates stored in a module to authenticate communications with a manufacturer.

In an optional step, the service tool 220 may first determine that the anticipated operation will be possible by send a precheck message 250 to the secure controller 210 to request whether the secure operation, e.g., to add, delete, or restore a key, is allowed. If allowed, the secure controller 210 will reply in the affirmative, i.e., providing an approval for further processing, such as with a "Pass" message 252. If the secure operation is not allowed (i.e., there is a failure to meet preconditions), the secure controller will reply in the negative, i.e., with a "Fail" message (not shown) to the service tool 220, terminating the secure service operation. Such a negative response can include a reason why the request did not meet preconditions and permit a user to resolve the issue and make another attempt at the secure service operation.

A user can input data such as user credentials, vehicle identification (e.g., VIN), and the secure service operation requested (e.g., retail user key add) to the service tool 220 using known input devices such as keypads and/or barcode readers. A processor in the service tool 220 can generate a service tool request message 254 including the input data and identifying data (ID) of the service tool 220, e.g., a unique string. With the service tool 220 connected to the wide area network 116, the user can send the service tool request message 254 to the service management server 230 (for delivery of the identifying data to the access management server 240).

The service management server 230 provides a service cloud backend for the service tool 220 operations. The service management server 230 may be referred to as a "remote" server because it is geographically remote from a vehicle 102 and service tool 220 and is accessed via the wide area network 116 rather than a direct or local connection. The service management server 230 receives the service tool request message 254 with data such as ID of the service tool 220, user credentials, vehicle identification (e.g., VIN), and the secure service operation requested (e.g., retail user key add), and performs an authorization based upon confirming that it has received a valid request from an authorized service tool and authorized service user. If properly authorized, the service management server 230 creates and transmits a secure service request message 256 including the data to the access management server 240.

The access management server 240 provides processing for the service management server 230 and service tool 220 operations, and as noted above, is responsible for generating and managing, in the example implementation of a key change, the digital key data required to activate or deactivate a specific digital key on each specific vehicle 102. The access management server 240 receives the secure service request message 256 from the service management server 230 and, based upon the included data, generates and transmits a secure service response message 258 to the service management server 230. The secure service response message 258 includes a secure payload, such as with the digital key data required to activate or deactivate a specific digital key (e.g., wireless key 112), in accordance with the requested secure service operation for the specific vehicle 102. Additionally, the data in the secure payload is time-limited or includes time limitations, such that the requested secure service operation is a vehicle-specific, operation-specific, time-limited authorization.

The service management server 230 receives the secure service response 258 and forwards the secure service response message 260 to the service tool 220, wherein the secure service response message 260 includes the secure payload with, in this implementation, the digital key data required to activate or deactivate a specific digital wireless key 112 in accordance with the requested secure service operation.

The service tool 220 receives the secure service response message 260 that includes the secure payload from the service management server 230 while the service tool 220 is connected to the wide area network 116. However, the service tool 220 is not required to be connected to the secure controller 210 of vehicle 102 when the secure service response message 260 is received (but must still have the requesting user be authorized to the service tool 220).

The authorized service user can then connect the service tool 220 to the secure controller 210 of vehicle 102 using the vehicle communication interface, but may be disconnected from the wide area network 116. The service tool 220 can then transmit the secure payload with the digital key data required to activate or deactivate a specific digital key in accordance with the requested secure service operation to the secure controller 210 in a secure command message 262.

The secure controller 210 receives and unpacks the secure payload in the secure command message 262 and uses the digital key data in the secure payload to activate or deactivate a specific digital key in accordance with the requested secure service operation. In securing the secure payload and/or use of digital keys, the secure controller 210 and the access management server 240 may use asymmetric cryptographic keys to reduce the computational and memory burdens of long-time storage of symmetric keys.

After activating or deactivating a specific digital key (e.g., wireless key 112) in accordance with the requested secure service operation, the secure controller 210 generates and transmits an access event message 264 to the service tool 220 indicating a successful secure service operation. The service tool 220 may then disconnect from the secure controller 210, connect to the wide area network 116, and send access event message 266 to the service management server 230, which relays access event message 268 to the access management server 240. Data in the access event message 266 may be saved at the service management server 230 and data in access event message 268 may be saved at the access management server 240 to update device association records and record the information for audit and tracking purposes.

Computers having processors and memories, including those in the herein-disclosed secure controller 210, service tool 220, service management server 230, and access management server 240, may take any suitable form. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU. The memory can be a separate device from the computer, and the computer can retrieve information stored in the memory, e.g., one or more computers can obtain data to be stored via a vehicle network in the vehicle 102 or a storage array connected to a server, e.g., over an Ethernet bus, a CAN bus, a wireless network, etc. Alternatively, or additionally, the memory can be part of the computer, i.e., as a memory of the computer or firmware of a programmable chip.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a computing device including a processor and a memory, wherein the memory stores instructions executable by the processor such that the computing device is programmed to:
transmit a service tool request for a secure service operation on a specific vehicle being serviced to a remote server over a wide area network, wherein the service tool request includes the secure service operation, credentials of a service user, and credentials of the computing device;
receive a secure service response over the wide area network from the remote server upon a verification of the service tool request, the secure service response containing a secure payload; and
transmit the secure payload to a secure controller of the specific vehicle over a vehicle communication interface regardless of whether the computing device is connected to the wide area network.

2. The system of claim 1, wherein the secure service operation includes an identification of the specific vehicle and a specific vehicle key to be added, deleted, or restored to the specific vehicle.

3. The system of claim 2, wherein the specific vehicle key is selected from a retail user key, a factory key, and a fleet key.

4. The system of claim 1, further comprising a service management server connected to the wide area network,
wherein the remote server is an access management server,
wherein the instructions programmed to transmit the service tool request to the access management server transmit the service tool request to the service management server,
wherein the instructions programmed to receive the secure service response from the access management server receives the secure service response from the service management server, and
the service management server includes a server processor and a server memory, wherein the server memory stores instructions executable by the server processor such that the service management server is programmed to:
confirm that the secure service operation is valid and that the service user and computing device are authorized based upon their respective credentials;
create a secure service request based upon the service tool request;
transmit the secure service request to the access management server;
receive the secure service response from the access management server; and
forward the secure service response to the computing device.

5. The system of claim 4, wherein the instructions executable by the processor further include instructions such that the computing device is programmed to:
receive an access event message from the secure controller indicating the secure payload is received; and
relay the access event message to the service management server, and
wherein the instructions executable by the server processor further include instructions such that the server computing device is programmed to:
receive an access event message from the computing device indicating the secure payload is received; and
relay the access event message to the access management server.

6. The system of claim 1, wherein the instructions executable by the processor further include instructions to perform a pre-check prior to transmitting the service tool request such that the computing device is programmed to:
receive input of the secure service operation;
transmit a precondition check for the secure service operation to the secure controller of the specific vehicle over the vehicle communication interface; and
receive an authorization from the secure controller.

7. The system of claim 6, wherein the secure service operation includes an identification of the specific vehicle and a specific vehicle key to be added, deleted, or restored to the specific vehicle.

8. The system of claim 7, wherein the specific key is selected from a retail user key, a factory key, and a fleet key.

9. The system of claim 1, wherein the instructions executable by the processor further include instructions such that the computing device is programmed to:
receive an access event message from the secure controller indicating the secure payload is received; and
relay the access event message to the remote server.

10. A method, comprising:
transmitting, from a computing device, a service tool request for a secure service operation on a specific vehicle being serviced to a remote server over a wide area network, wherein the service tool request includes the secure service operation, credentials of a service user, and credentials of the computing device;
receiving, at the computing device, a secure service response over the wide area network from the remote server upon a verification of the service tool request, the secure service response containing a secure payload; and
transmitting the secure payload to a secure controller of the specific vehicle over a vehicle communication interface regardless of whether the computing device is connected to the wide area network.

11. The method of claim 10, wherein the secure service operation includes an identification of the specific vehicle and a specific vehicle key to be added, deleted, or restored to the specific vehicle.

12. The method of claim 11, wherein the specific vehicle key is selected from a retail user key, a factory key, and a fleet key.

13. The method of claim 10,
wherein the remote server is an access management server,
wherein transmitting of the service tool request to the access management server includes transmitting the service tool request to a service management server, wherein receiving of the secure service response from the access management server includes receiving the secure service response from the service management server, and the method further includes:

confirming, at the service management server, that the secure service operation is valid and that the service user and computing device are authorized based upon their respective credentials;

creating, at the service management server, a secure service request based upon the service tool request;

transmitting, from the service management server, the secure service request to the access management server;

receiving, at the service management server, the secure service response from the access management server; and forwarding, by the service management server, the secure service response to the computing device.

14. The method of claim 13, further including:

receiving, at the computing device, an access event message from the secure controller indicating the secure payload is received; and relaying, from the computing device, the access event message to the service management server, receiving, at the service management server, the access event message from the computing device indicating the secure payload is received; and relaying, from the service management server, the access event message to the access management server.

15. The method of claim 10, further comprising performing a pre-check prior to transmitting the service tool request by:

receiving, at the computing device, input of the secure service operation;

transmitting, from the computing device, a precondition check for the secure service operation to the secure controller of the specific vehicle over the vehicle communication interface; and receiving, at the computing device, an authorization from the secure controller.

16. The method of claim 15, wherein the secure service operation includes an identification of the specific vehicle and a specific vehicle key to be added, deleted, or restored to the specific vehicle.

17. The method of claim 16, wherein the specific key is selected from a retail user key, a factory key, and a fleet key.

18. The method of claim 10, further comprising:

receiving, at the computing device, an access event message from the secure controller indicating the secure payload is received; and relaying, from the computing device, the access event message to the remote server.

* * * * *